imary Examiner—Mark Rosenbaum

United States Patent [19]
Allor et al.

[11] Patent Number: 4,499,646
[45] Date of Patent: Feb. 19, 1985

[54] METHOD OF ATTACHING A METAL SHAFT TO A CERAMIC SHAFT AND PRODUCT PRODUCED THEREBY

[75] Inventors: Richard L. Allor, Livonia; John C. Caverly, Dearborn, both of Mich.

[73] Assignee: Ford Motor Company, Dearborn, Mich.

[21] Appl. No.: 511,438

[22] Filed: Jul. 7, 1983

[51] Int. Cl.³ .................. B23P 16/02; F16D 1/00; F16B 4/00
[52] U.S. Cl. ........................ 29/447; 403/28; 403/273
[58] Field of Search .......... 403/28, 29, 30, 273; 29/446, 447, 450, 451, 455 R

[56] References Cited

U.S. PATENT DOCUMENTS 3,668,754  6/1972  Boast .......................... 29/447
4,377,335  3/1983  Fannon et al. ................ 29/447

FOREIGN PATENT DOCUMENTS 2734747  2/1979  Fed. Rep. of Germany ...... 403/273

Primary Examiner—Mark Rosenbaum
Assistant Examiner—Steven E. Nichols
Attorney, Agent, or Firm—William E. Johnson; Olin B. Johnson

[57] ABSTRACT

A method of attaching a metal shaft (10) to a ceramic shaft (12) having a first diameter ($d_1$) is characterized by the following steps. A shaft portion (16) is formed on the ceramic shaft with a second diameter ($d_2$) less than the first diameter. The shaft portion extends from a free end (18) thereof along a portion of the length of the ceramic shaft to a terminal end (20) thereof where the ceramic shaft has a raised portion (22) formed thereon having a third diameter ($d_3$) less than the first diameter but greater than the second diameter. The free end of the shaft portion has threads (24) thereon. A circular shaped expansion sleeve (26) is placed on the shaft portion in an encircling relationship therewith, the expansion sleeve extending from the raised portion of the metal shaft to a location (28) adjacent a termination of the threads on the shaft portion. All of the members are cooled and then assembled with the metal shaft. The metal shaft is formed so as to have both a hollow interior portion (30) having a diameter slightly greater than the third diameter of the raised portion of the ceramic shaft and an internally threaded hollow portion (32). The assembly is carried out so that the threads of the ceramic shaft are mated with the threads of the metal shaft. The expansion sleeve is trapped in a volume defined by the shaft portion of the ceramic shaft, the hollow interior portion of the metal shaft, the raised portion of the ceramic shaft, and a closed end (34) of the hollow interior portion of the metal shaft.

2 Claims, 2 Drawing Figures

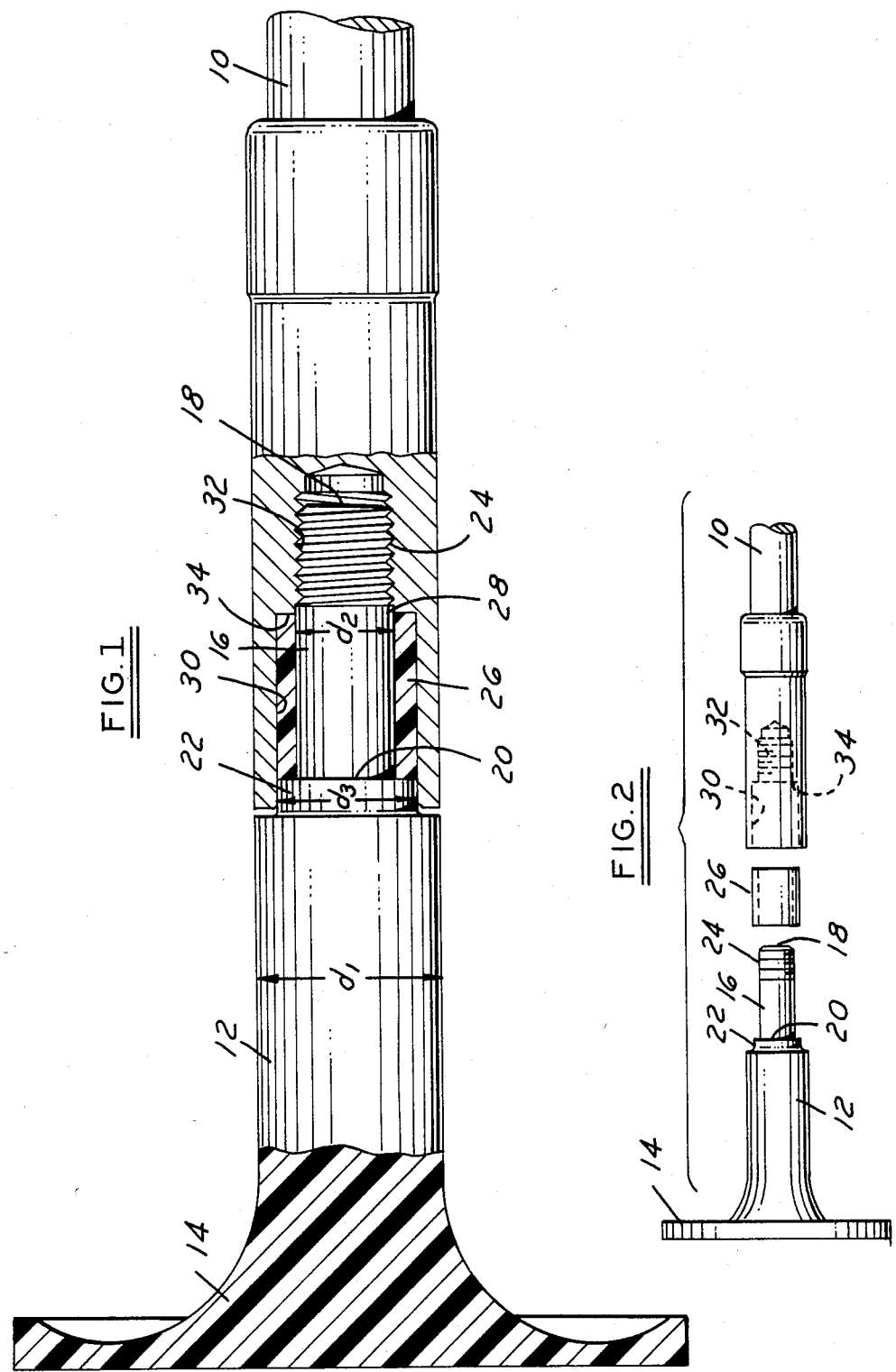

METHOD OF ATTACHING A METAL SHAFT TO A CERAMIC SHAFT AND PRODUCT PRODUCED THEREBY

STATEMENT

This invention, herein described, was made in the course of or under a contract or subcontract thereunder with The Department of the Army, Contract No. DAAG-46-7-C-0028.

BACKGROUND ART AND PRIOR ART STATEMENT

No prior art search was conducted on the subject matter of this specification in the U.S. Patent and Trademark Office or any other search facility. We are unaware of any prior art attachment method for attaching a metal shaft to a ceramic shaft or product produced thereby which is relevant to the method and product disclosed in this specification other than the information which is set out hereinbelow.

Parts formed from high temperature resistant ceramics are usually thought of as replacements for high temperature parts in turbine and piston engines. Presently, the parts for such turbines and piston engines are made of very expensive metal alloys which have operating temperature limits in a range of 1800°–2000° F. Such temperature limits presently limit the thermal efficiency of turbine and piston engines. The thermal efficiency of such turbine and piston engines can be improved if ceramic parts are substituted for the metal alloys as the ceramic parts could have operational temperature limits in a range of 2300°–2500° F. or higher. Such an increase in operational temperature, of course, provides for greater thermodynamic efficiency as is well known in the art.

Unfortunately, replacing metal alloy parts with ceramic parts generally requires a ceramic to metal joint at some point. These joints are difficult to form because ceramics have very low thermal expansion rates as compared to the thermal expansion rates of the metal alloys now being used. Thermal expansion rate is a measure of how fast a sample of material expands or grows as it is heated. The coefficient of thermal expansion is generally noted as alpha ($\alpha$) and its units are inches per inch per degree farenheit. Generally, a one inch long steel bar will expand about ten millionths of an inch per one degree farenheit increase in temperature (alpha $= 10 \times 10^{-6}$ in/in/° F.). Silicon nitride ceramics generally expand at about one-fifth of the rate for steel (alpha $= 1 - 2 \times 10^{-6}$ in/in/° F.).

If a ceramic/metal attachment joint is heated or cooled from its assembly temperature, the steel half of the joint changes shape and size five times faster than the ceramic half of the joint. The steel half of the joint attempts to drag the ceramic half of the joint with it either through some interlocking feature such as ceramic over steel shaft joint, or a locking caused by frictional forces. Unfortunately ceramic to metal joints exhibit very high coefficients of friction. The growth of ceramic and steel parts due to heating is unstoppable. Any externally applied forces used to try to maintain original shapes during heating of parts which are subject to such growth merely cause the piece being restrained to develop whatever forces are required to overcome the restraint. Hence, if the ceramic half of the ceramic/metal joint tries to restrain a more rapidly expanding metal, huge forces rapidly develop in the ceramic/metal joint which result in rapid and certain failures to the ceramic portion of the joint.

In the past, we have attached ceramic rotors with a mounting system that used curvic gear teeth between the ceramic part and the metal part to hold the parts together. The frictional forces generated between the teeth during heating of the ceramic and metal joined structure caused rapid failure of the ceramic part of the joint. A 100° F. increase in temperature above assembly temperature of the ceramic/metal joint was enough to break the ceramic half of the joint due to the forces applied thereon by the growing metal half of the joint. The teeth of the metal curvic gear had to be plated with pure gold in order to cause a slipping condition between the teeth rather than a lockup between the teeth of the ceramic half and the metal half of the joined structure. Gold plating in such a manner had the ability to provide operation of such a joined structure at a temperature in a range of 1400°–1800° F., but the lubricating ability of the gold plate was only good for 8-10 thermal cycles on the joint. After this number of thermal cycles, the joint would fail. Additionally, the curvic teeth are ground by special machinery and very few people are skilled in the manufacture of such teeth. The cost of grinding the teeth was several hundred dollars per set of teeth, and mounting one rotor required four such sets of teeth.

The method of attaching a metal shaft to a ceramic shaft set forth in this specification is one designed to reduce the severity of the thermal gradients set forth in the joint by placing in an area of the turbine bearing compartment where the temperature during operation generally would not exceed 400° F. The unique method of attaching a metal shaft to a ceramic shaft and product produced thereby will be discussed in greater detail hereinbelow, but such a method is economical to carry out and very reliable in joining such structures.

DISCLOSURE OF THE INVENTION

This invention relates to a method of attaching a metal shaft to a ceramic shaft and to the product produced thereby. In accordance with the teachings of this specification, a method of attaching a metal shaft to a ceramic shaft having a first diameter is characterized by the following steps.

A shaft portion having a second diameter less than the first diameter of the ceramic shaft is formed on the ceramic shaft. The shaft portion extends from a free end of the ceramic shaft along a portion of the length of the ceramic shaft to a terminal end thereof where the ceramic shaft has a raised portion. The raised portion is formed on the ceramic shaft with a third diameter which is less than the first diameter but greater than the second diameter. The free end of the shaft portion has threads formed thereon.

A circular shaped expansion sleeve which has an internal diameter slightly greater than the second diameter of the shaft portion of the ceramic shaft is placed on the shaft portion of the ceramic shaft. The expansion sleeve extends along the shaft portion of the ceramic shaft from a location adjacent a termination of the threads on the shaft portion of the ceramic shaft to the raised portion of the ceramic shaft.

The ceramic shaft and expansion sleeve placed thereon are cooled to the contract the mentioned members.

A metal shaft formed so as to have both an axially extending hollow interior portion having a diameter slightly greater than the third diameter of the raised portion of the ceramic shaft and an inwardly threaded hollow portion formed coaxially with the hollow interior portion of the metal shaft is assembled with the other members. The internally threaded hollow portion of the metal shaft is threaded in a manner which makes it mateable with the threads formed on the free end of the shaft portion of the ceramic shaft. When assembled, the threads on the free end of the shaft portion of the ceramic shaft are engaged with the threads formed on the internally threaded portion of the metal shaft. Also, the expansion sleeve is trapped in a volume defined by the shaft portion of the ceramic shaft, the hollow interior portion of the metal shaft, the raised portion of the ceramic shaft, and a closed end of the hollow interior portion of the metal shaft.

The method is operative to join the metal shaft to the ceramic shaft because of the action of the expansion sleeve which attempts to expand upon heating but is restrained by the surrounding structures and hence generates a high pressure which locks the parts together.

The product produced by the method disclosed above is characterized in the following manner.

The ceramic shaft to be attached to the metal shaft has a shaft portion formed thereon having a second diameter less than the first diameter of the ceramic shaft. The shaft portion extends along a portion of the length of the ceramic shaft to a terminal end thereof where the ceramic shaft has a raised portion formed thereon having a third diameter less than the first diameter but greater than the second diameter. The free end of the shaft portion of the ceramic shaft has threads formed thereon.

A circular shaped expansion sleeve having an internal diameter slightly greater than the second diameter of the shaft portion of the ceramic shaft encircles the shaft portion of the ceramic shaft. The expansion sleeve extends along the shaft portion from a location adjacent a termination of the threads on the shaft portion of the ceramic shaft to the raised portion of the ceramic shaft.

A metal shaft is also provided which is formed so as to have both an axially extending hollow interior portion having a diameter slightly greater than the third diameter of the raised portion of the ceramic shaft and an internally threaded hollow portion formed coaxially with the hollow interior portion of the metal shaft. The internally threaded hollow portion of the metal shaft is mateable with the threads formed on the free end of the shaft portion. When the metal shaft is assembled with the ceramic shaft, the following conditions are observed. The threads on the free end of the shaft portion of the ceramic shaft are engaged with the threads formed on the internally threaded portion of the metal shaft. Also, the expansion sleeve is trapped in a volume defined by the shaft portion of the ceramic shaft, the hollow interior portion of the metal shaft, the raised portion of the ceramic shaft, and a closed end of the hollow interior portion of the metal shaft.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings wherein like reference characters indicate like parts throughout the several figures and in which:

FIG. 1 shows a metal shaft attached to a ceramic shaft in accordance with the teachings of the method of this invention; and wherein FIG. 2 shows the parts of FIG. 1 in a disassembled condition.

BEST MODE AND INDUSTRIAL APPLICABILITY

The following description is what we consider to be a preferred embodiment of out method of attaching a metal shaft to a ceramic shaft and product produced thereby. The following description also sets forth what we now contemplate to be the best mode of carrying out the method of this invention to produce the product of this invention. This description is not intended to be a limitation upon the broader principles of this method and product produced thereby, and while preferred material are used to illustrate the method in accordance with the requirements of the patent laws, it does not mean that the method is operative only with the stated materials as others may be substituted therefor.

A preferred embodiment of the method of our invention will be set forth below to describe the attachment of a metal shaft 10, formed from a metal such as a high strength steel, to a ceramic shaft 12, formed of a material such as silicon nitride. The ceramic shaft 12 has a principal portion thereof of a diameter $d_1$. As viewed in FIG. 1, the principal portion of the shaft 12 terminates at its left end in a rotor structure 14 formed together with the shaft 12. The individual rotor blades of the rotor structure are not defined in the drawings for the sake of simplicity.

A shaft portion 16 is also formed on the ceramic shaft 12. The shaft portion 16 has a diameter $d_2$ less than the first diameter $d_1$ of the principal portion of the ceramic shaft 12. The shaft portion extends from a free end 18 to a terminal end 20 thereof where the ceramic shaft has a raised portion 22 formed thereon. The raised portion has a third diameter $d_3$ less than the first diameter $d_1$ but greater than the second diameter $d_2$. The free end of the ceramic shaft has threads 24 formed thereon.

The next step in the method of our invention is one in which a circular shaped expansion sleeve 26 is placed on the shaft portion 16 of the ceramic shaft 12 in an encircling relationship therewith. At room temperature the expansion sleeve has an internal diameter which is somewhat greater than the second diameter $d_2$ of the shaft portion 16 of the ceramic shaft. At room temperature the expansion sleeve 26 extends along the shaft portion 16 from a location 28 adjacent a termination of the threads 24 on the shaft portion of the ceramic shaft to the raised portion 22 of the ceramic shaft.

The expansion sleeve is an important element in carrying out the method of our invention and of producing the product produced thereby. The expansion sleeve is normally formed of a resinous material. We prefer to use a polyimide resin such as that type of resin sold by Dupont as Vespel SP-22. The expansion sleeve is designed to have a thermal expansion rate approximately twice as great as steel and 10 times as great as that of the ceramic. Normally the plastic is soft compared to steel and ceramic and complies to the ceramic and, therefore, does not cause high local contract stresses in the ceramic material. Normally the expansion sleeve should be made of a material which has an upper working temperature in the range of 300°–400° F. Also, the bulk modulus of the plastic forming the expansion sleeve should be low enough to allow pressures in the range of 10,000 psi to be generated when the material is trapped in an entrapping volume and the structure is heated to a temerature above its assembly temperature. Any material which meets these qualification may be used to form the expansion sleeve 26.

The next step in the method of our invention is to cool the ceramic shaft 12 and the expansion sleeve 26 which has been placed over the shaft portion 16 of the ceramic shaft in order to contract these members. The members are cooled by placing them in a dry ice/alcohol solution having a temperature 80° to 100° below zero farenheit. Upon cooling, the expansion sleeve 26 contracts lengthwise so that its free end terminates at the location 28 of the shaft portion 16 of the ceramic shaft 12 and its internal diameter is brought into contact with the diameter $d_2$ of the shaft portion of the ceramic shaft.

While the members remain in a cooled condition, the metal shaft 10 is assembled therewith. The metal shaft is formed so as to have both an axially extending hollow interior portion 30 and an internally threaded hollow portion 32. The hollow interior portion 30 of the metal shaft has a diameter slightly greater than the third diameter $d_3$ of the raised portion 22 of the ceramic shaft 12. The internally threaded hollow portion 32 of the metal shaft is mateable with the threads 24 on the free end 18 of the shaft portion 16 of the ceramic shaft 12.

When the metal shaft 10 and the ceramic shaft 12 are connected with one another, the following conditions prevail. The threads 24 on the free end 18 of the shaft portion 16 of the ceramic shaft 12 are engaged with the threads formed on the internally threaded hollow portion 32 of the metal shaft 10. Also, the expansion sleeve 26 is trapped in a volume defined by the shaft portion 16 of the ceramic shaft 12, the hollow interior portion 30 of the metal shaft, the raised portion 22 of the ceramic shaft, and a closed end 34 of the hollow interior portion 30 of the metal shaft.

In accordance with a preferred embodiment of this invention, the expansion sleeve 26 is designed to be about 1–2% larger than the room temperature volume in which it is confined. Thus, as the assembly comes back to ambient temperature, after assembly at low temperature, the plastic expansion sleeve 26 tries to expand and, since it is confined within the confinement space, it generates pressure in the volume it occupies, thus locking the whole assembly together as a unitary piece. As the entire assembly is heated to an operational temperature, the pressure inside the closed volume increases due to the expansion of the expansion sleeve thus increasing the locking forces to retain the metal shaft 10 locked to the ceramic shaft 12.

Thus, in accordance with the method of this invention, there is produced an attachment between a metal shaft and a ceramic shaft having a first diameter. The attachment is characterized in the following manner.

The ceramic shaft has a shaft portion formed thereon having a second diameter less than the first diameter of the ceramic shaft. The shaft portion extends from a free end of the ceramic shaft along a portion of the length of the ceramic shaft to a terminal end thereof where the ceramic shaft has a raised portion formed thereon. The raised portion of the ceramic shaft has a third diameter which is less than the first diameter but greater than the second diameter. The free end of the shaft portion has threads formed thereon.

A circular shaped expansion sleeve has an internal diameter slightly greater than the second diameter of the shaft portion of the ceramic shaft. The expansion sleeve encircles the shaft portion of the ceramic shaft and extends along the shaft portion from a location adjacent a termination of the threads on the shaft portion of the ceramic shaft to the raised portion of the ceramic shaft.

The metal shaft is formed so as to have both an axially extending hollow interior portion having a diameter slightly greater than the third diameter of the raised portion of the ceramic shaft and an internally threaded hollow portion formed coaxially with the hollow interior portion of the metal shaft. When assembled, the internally threaded hollow portion of the metal shaft is mated with the threads formed on the free end of the ceramic shaft. Also, the expansion sleeve is trapped in a volume defined by the shaft portion of the ceramic shaft, the hollow interior portion of the metal shaft, the raised portion of the ceramic shaft, and a closed end of the hollow interior portion of the metal shaft.

While a particular embodiment of the method and product of this invention has been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. A method of attaching a metal shaft to a ceramic shaft having a first diameter, characterized by the steps of:

forming on the ceramic shaft a shaft portion having a second diameter less than the first diameter of the ceramic shaft, said shaft portion extending from a free end of the ceramic shaft along a portion of the length of the ceramic shaft to a terminal end thereof where the ceramic shaft has a raised portion formed thereon having a third diameter less than the first diameter but greater than said second diameter, said free end of said shaft portion having threads formed thereon;

placing on said shaft portion of the ceramic shaft in an encircling relationship therewith a circular shaped expansion sleeve which has an internal diameter slightly greater than said second diameter of said shaft portion of the ceramic shaft, said expansion sleeve extending along said shaft portion from a location adjacent a termination of said threads on said shaft portion of the ceramic shaft to said raised portion of the ceramic shaft;

cooling the ceramic shaft and said expansion sleeve to contract said mentioned members;

assembling with said cooled members a metal shaft formed so as to have both an axially hollow interior portion having a diameter slightly greater than said third diameter of said raised portion of the ceramic shaft and an internally threaded hollow portion formed coaxially with said hollow interior portion of the metal shaft, said internally threaded hollow portion being mateable with said threads formed on said free end of said shaft portion, said assembly being carried in a manner such that (A) said threads on said free end of said shaft portion are engaged with said threads formed on said internally threaded portion of said metal shaft, and (B) said expansion sleeve is trapped in a volume defined by said shaft portion of the ceramic shaft, said hollow interior portion of said metal shaft, said raised portion of the ceramic shaft, and a closed end of said hollow interior portion of said metal shaft.

2. An attachment between a metal shaft and a ceramic shaft having a first diameter, the attachment being characterized in that:

the ceramic shaft has a shaft portion formed thereon having a second diameter less than the first diameter of the ceramic shaft, said shaft portion extending from a free end of the ceramic shaft along a portion of the length of the ceramic shaft to a terminal end thereof where the ceramic shaft has a raised portion formed thereon having a third diameter less than the first diameter but greater than said second diameter, said free end of said shaft portion having threads formed thereon;

a circular shaped expansion sleeve having an internal diameter slightly greater than said second diameter of said shaft portion of the ceramic shaft, said expansion sleeve encircling and extending along said shaft portion from a location adjacent a termination of said threads on said shaft portion of the ceramic shaft to said raised portion of the ceramic shaft; and a metal shaft formed so as to have both an axially extending hollow interior portion having a diameter slightly greater than said third diameter of said raised portion of the ceramic shaft and an internally threaded hollow portion formed coaxially with said hollow interior portion of the metal shaft, said internally threaded hollow portion being mateable with said threads formed on said free end of said shaft portion, said assembly being carried out in a manner such that (A) said threads on said free end of said shaft portion are engaged with said threads formed on said internally threaded portion of said metal shaft, and (B) said expansion sleeve is trapped in a volume defined by said shaft portion of the ceramic shaft, said hollow interior portion of said metal shaft, said raised portion of said ceramic shaft, and a closed end of said hollow interior portion of said metal shaft.

* * * * *